United States Patent [19]

Miyamoto

[11] Patent Number: 5,010,358
[45] Date of Patent: Apr. 23, 1991

[54] PREDETERMINED MAGNIFICATION PHOTOGRAPHING APPARATUS FOR A CAMERA

[75] Inventor: Hidenori Miyamoto, Kawasaki, Japan

[73] Assignee: Nikon Corporation, Tokyo, Japan

[21] Appl. No.: 448,322

[22] Filed: Dec. 11, 1989

[30] Foreign Application Priority Data

Dec. 13, 1988 [JP] Japan ............................. 63-315778

[51] Int. Cl.⁵ ..................... G03B 3/00; G03B 13/18; G03B 1/18
[52] U.S. Cl. ................................ 354/402; 354/195.12
[58] Field of Search ............... 354/402, 403, 404, 405, 354/406, 407, 408, 409, 195.1, 195.12, 195.13

[56] References Cited

FOREIGN PATENT DOCUMENTS

| | | |
|---|---|---|
| 53-113527 | 10/1978 | Japan . |
| 58-103273 | 6/1983 | Japan . |
| 63-131112 | 6/1988 | Japan . |
| 63-22118 | 9/1988 | Japan . |

*Primary Examiner*—L. T. Hix
*Assistant Examiner*—Cassandria C. Spyrou
*Attorney, Agent, or Firm*—Shapiro and Shapiro

[57] ABSTRACT

In a camera using a zoom lens for effecting zoom photographing at a predetermined photographing magnification, a detecting apparatus detects distance to an object moving along the optic axis of the zoom lens and detects speed of the object. A control device causes the detecting device to detect the distance to the object and the speed of the object repetitively as long as an operation signal (e.g., a signal from a shutter release button) is produced, repetitively predicts the distance to the object after a predetermined time on the basis of the detected distance and the detected speed, repetitively determines a desired zoom position of the zoom lens on the basis of the predicted distance, and operates a driving device to drive the zoom lens to a desired zoom position.

17 Claims, 16 Drawing Sheets

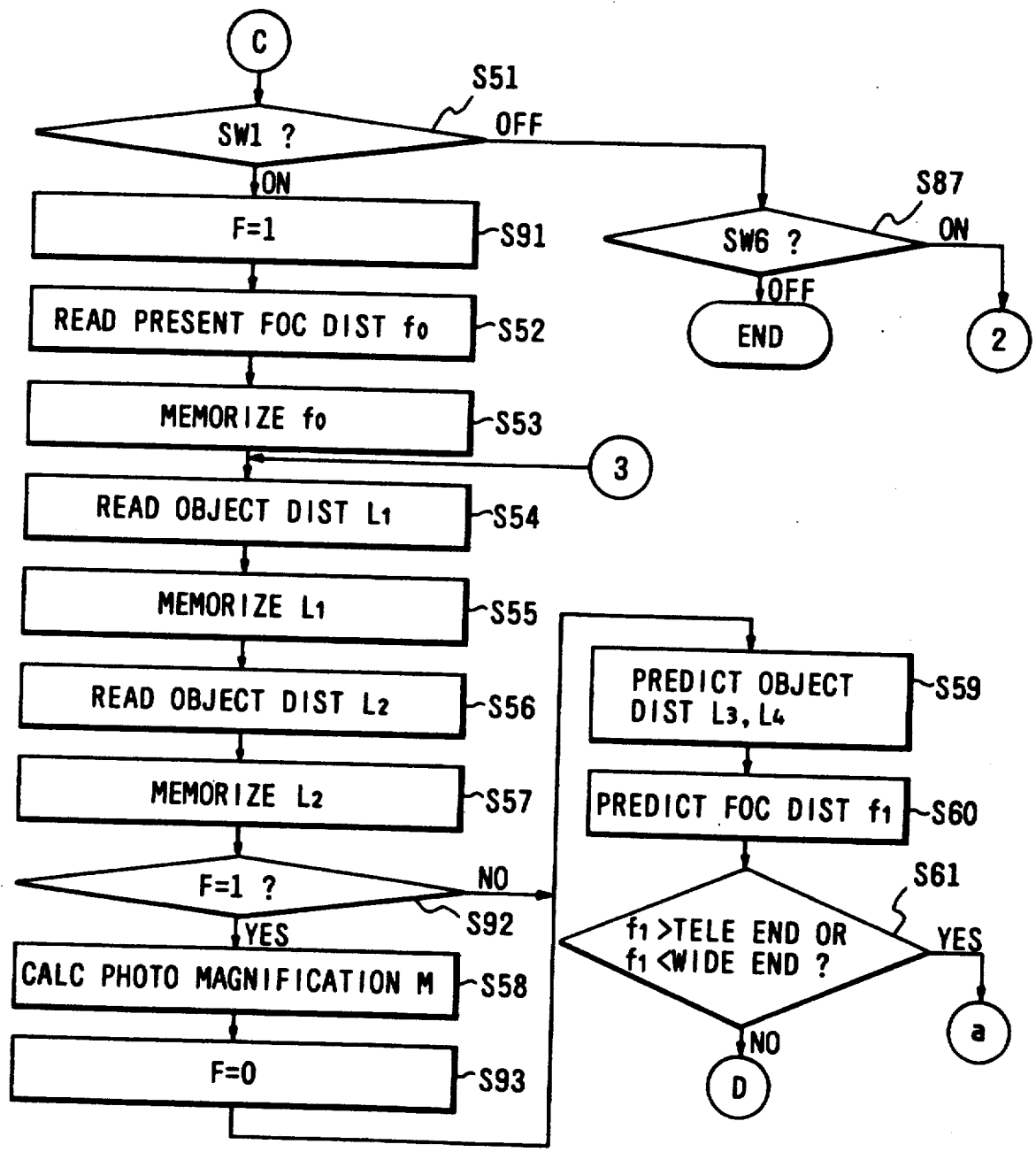

PREDETERMINED MAGNIFICATION PHOTOGRAPHING APPARATUS FOR A CAMERA

BACKGROUND OF THE INVENTION

1. Field of the Invention

This invention relates to a predetermined magnification photographing apparatus for a camera.

2. Related Background Art

Cameras capable of accomplishing predetermined magnification photographing are known. Predetermined magnification photographing means that an object is photographed always at the same size (the same photographing magnification) irrespective of the distance to the object (the object distance). That is, in cameras of this type, such a focal distance of a zoom lens that an object is photographed at a photographing magnification conforming to a predesignated object size (for example, the so-called waist shot size or bust shot size) is calculated on the basis of the object distance detected by a distance measuring device or the like with the half-depression operation of a release button, and the zoom lens is driven to this calculated focal distance, whereafter photographing is effected with the full depression operation of the release button.

In the prior-art camera of this type, however, when in the case of predetermined magnification photographing, the zoom lens is zooming-driven to a predetermined focal distance by the half-depression operation of the release button, the zoom lens is fixed at that position. Therefore, when predetermined magnification photographing is to be effected for an object moving along the optic axis of the lens, it is necessary to perform the half-depression operation repetitively until a desired composition is obtained, and this means bad operability.

SUMMARY OF THE INVENTION

It is an objective of the present invention to improve the operability with which predetermined magnification photographing is effected for a moving object.

Describing the present invention with reference to FIG. 1 of the accompanying drawings, the present invention is provided with driving means 101 for driving a zoom lens, detecting means 102 for detecting the object distance regarding the distance to an object, calculating means 103 for calculating, on the basis of the detected object distance, such a focal distance of the zoom lens that the object is photographed at a preset photographing magnification, a release operation member 104 capable of accomplishing a release operation for commanding shutter release and a preliminary operation preceding the release operation, and control means 105 for operating detecting means 102 and calculating means 103 repetitively as long as release operation member 104 is preliminarily operated, and operating driving means 101 so that the zoom lens assumes the focal distance calculated by calculating means 103 each time detecting means 102 and calculating means 103 are operated, thereby achieving the above objective.

The control means 105 operates detecting means 102 and calculating means 103 repetitively as long as release operation member 104 is continuedly preliminarily operated, and operates driving means 101 each time detecting means 102 and calculating means 103 are operated, thereby making the zoom lens assume the focal distance calculated by calculating means 103. Thereby, as long as the half-depression operation is performed, the zoom lens is driven so as to always assume a predetermined photographing magnification for an object moving along the optic axis of the lens.

DESCRIPTION OF THE PREFERRED EMBODIMENTS

First Embodiment

A first embodiment of the present invention will hereinafter be described with reference to FIGS. 2 to 8.

Figure 1:
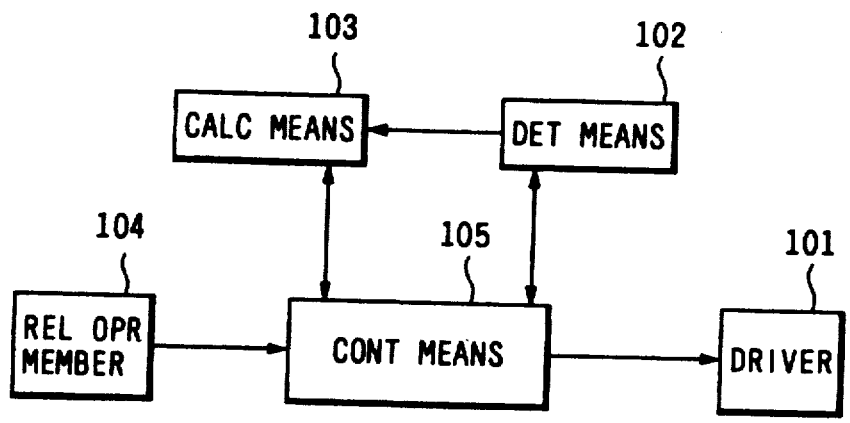
FIG. 1 is a block diagram for illustrating the present invention.
Figure 2:
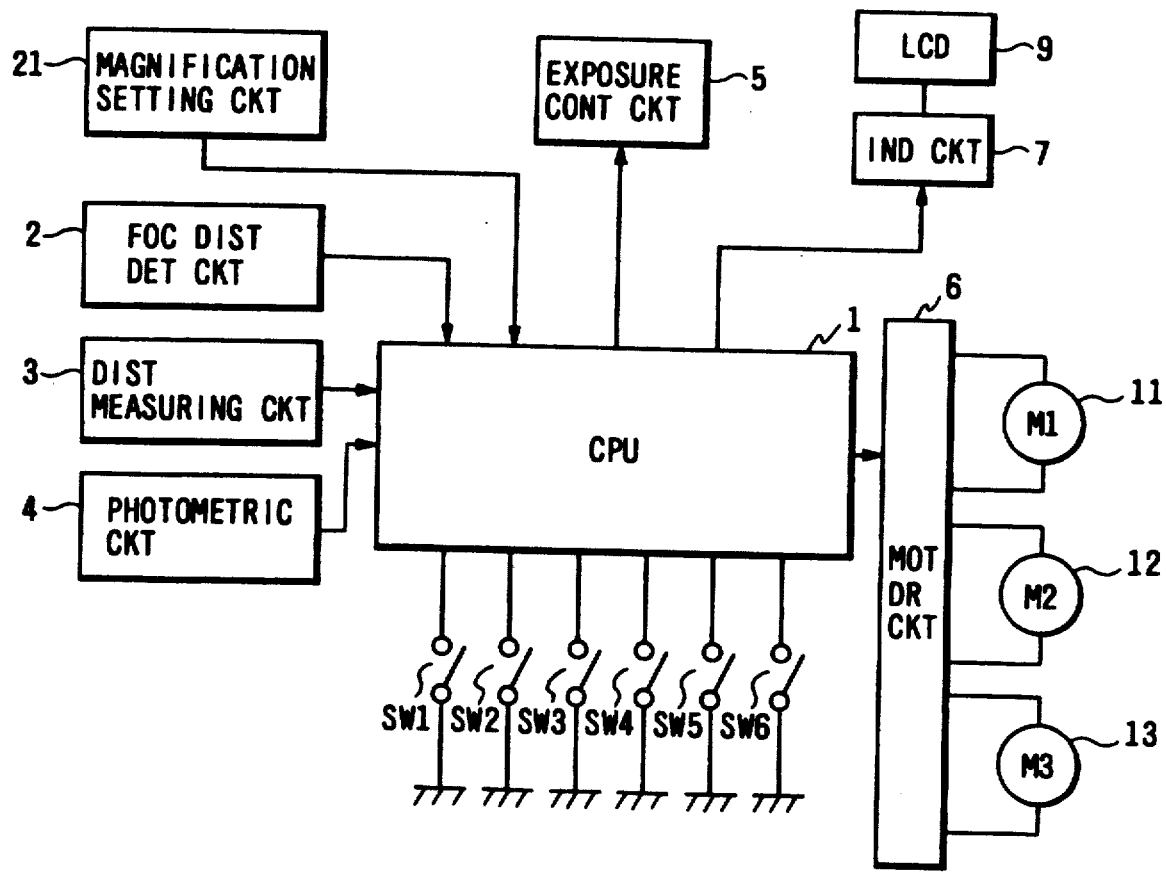
FIGS. 2 to 8 show a first embodiment of the present invention, FIG. 2 being a block diagram showing the general construction of a predetermined magnification photographing apparatus for a camera according to the present invention, and FIGS. 3-8 being flow charts showing the processing procedure in the camera.

Referring to FIG. 2 which shows the general construction, a focal distance detecting circuit 2, a distance measuring circuit 3 and a photometric circuit 4 are connected to a CPU 1 for controlling the sequence of the entire camera. The distance measuring circuit 3 detects distance information conforming to the distance to an object (the object distance) and inputs it to the CPU 1, and the photometric circuit 4 detects luminance information regarding the luminance of the object and inputs it to the CPU 1. The focal distance detecting circuit 2 detects the focal distance of a photo-taking lens (a zoom lens), not shown, and inputs it to the CPU 1.

Also, an exposure control circuit 5, a motor driving circuit 6, the indicating circuit 7 of a liquid crystal display device (hereinafter referred to as LCD) 9 and a magnification setting circuit 21 are connected to the CPU 1. A focusing motor 11, a zooming motor 12 and a film winding motor 13 are connected to the motor driving circuit 6, and in response to a zooming signal from the CPU 1 which will be described later, the photo-taking lens is driven by the motor 12, whereby the focal distance thereof is varied. Also, the motor driving circuit 6 drives the photo-taking lens to a predetermined focusing position by the motor 11 in response to a focusing signal from the CPU 1, and winds up film by one frame by the motor 13 in response to a winding-up signal. The exposure control circuit 5 drives an exposure control device such as a diaphragm and a shutter by a command from the CPU 1 and effects exposure. The magnification setting circuit 21 sets the photographing magnification during static predetermined magnification photographing which will be described later.

Further, six switches SW1-SW6 are connected to the CPU 1. The switches SW1 and SW2 are switches operatively associated with the operation of a release button (a release operation member), not shown, the switch SW1 being adapted to be closed by the half-depression operation (preliminary operation) of the release button, and the switch SW2 being adapted to be closed by the full depression operation (release operation) of the release button. The CPU 1 operates the distance measuring circuit 3 and the photometric circuit 4 with the closing of the switch SW1 and also operates the motor driving circuit 6 and the exposure control circuit 5 with the closing of the switch SW2 to thereby effect a series of photographing processes.

The switches SW3 and SW4 are switches adapted to be closed in response to the operation of a zooming button, not shown, and the switch SW3 remains closed as long as one end of the zooming button of the seesaw type is depressed, and the switch SW4 remains closed as long as the other end of the zooming button is depressed. The CPU 1 outputs a zooming signal to the motor driving circuit 6 with the closing of the switches SW3 and SW4, and changes the focal distance of the photo-taking lens to the long side as long as the switch SW3 is closed, and changes the focal distance to the short side as long as the switch SW4 is closed. These switches SW3 and SW4 are not closed at a time.

The switches SW5 and SW6 are switches adapted to be closed in response to the operations, respectively, of a static predetermined magnification mode setting button and a dynamic predetermined magnification mode setting button, not shown, and the CPU 1 sets the static predetermined magnification photographing mode with the closing of the switch SW5, and sets the dynamic predetermined magnification photographing mode with the closing of the switch SW6. These static and dynamic magnification photographing modes are basically modes in which the object is photographed at a predetermined object size, i.e., at a predetermined photographing magnification, irrespective of the object distance.

The static predetermined magnification photographing is effected chiefly for a stationary object, and the photographing magnification at that time corresponds to the object size (for example, the bust shot size or the waist shot size) input by the operation of an operating member, not shown, and is a value set by the above-mentioned magnification setting circuit 21 and input to the CPU 1. On the other hand, the dynamic predetermined magnification photographing is effected for an object moving along the optic axis of the zoom lens. That is, the speed of movement of the object is first detected, and with the time lag from the time of half-depression till the time of shutter release being taken into consideration, the object distance during the shutter release is foreseen, and the focal distance of the photo-taking lens is calculated on the basis of the foreseen object distance. Also, the photographing magnification during this dynamic predetermined magnification photographing is found from the then object distance and the focal distance of the photo-taking lens with the closing of the switch SW1.

When the respective mode setting buttons are operated during the setting of the static and dynamic predetermined magnification photographing modes, the switches SW5 and SW6 are opened, whereby the respective modes are released.

The control procedure of the predetermined magnification photographing by the CPU 1 will now be described with reference to the flow charts of FIGS. 3-8.

Figure 3:
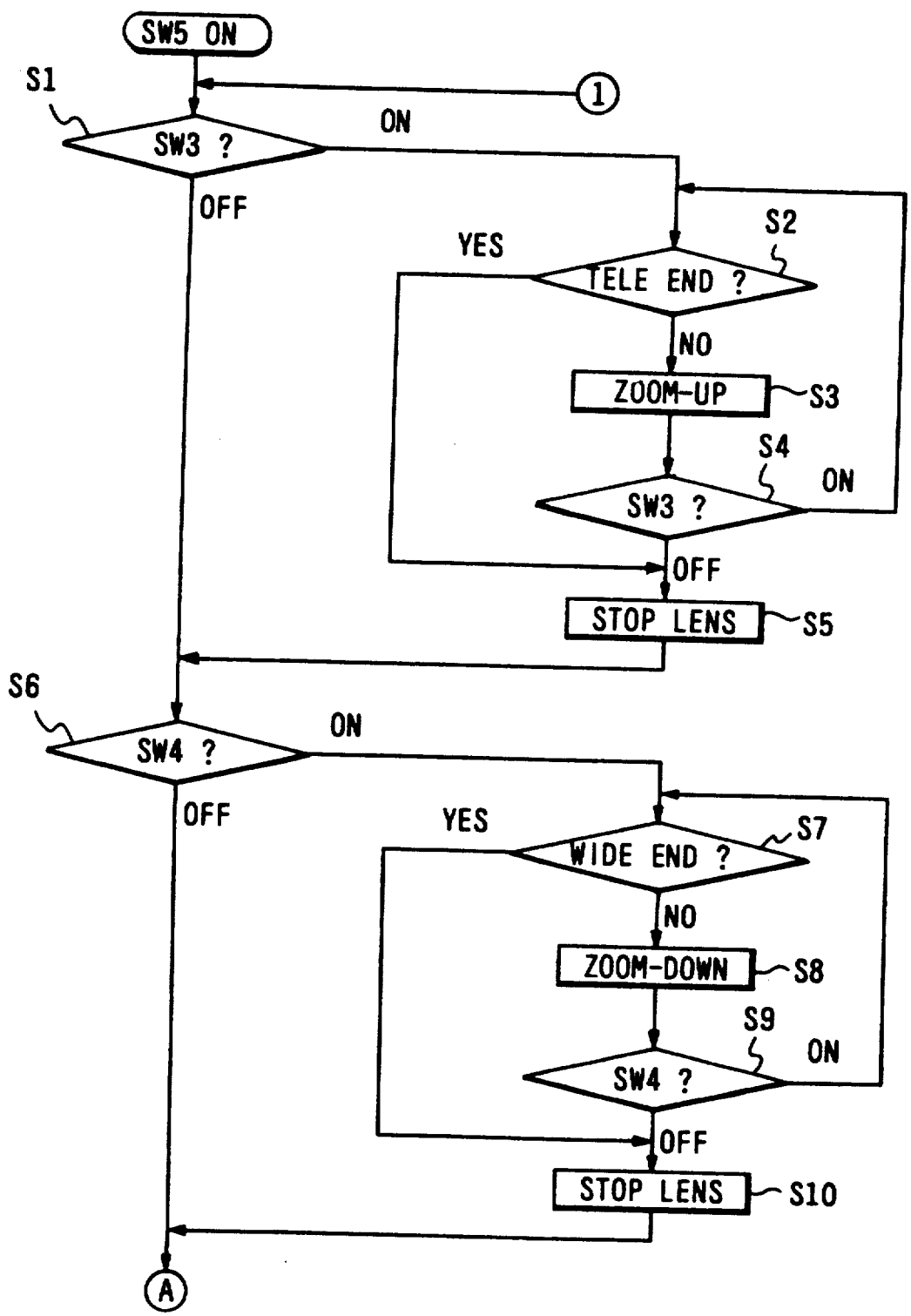
Figure 4:
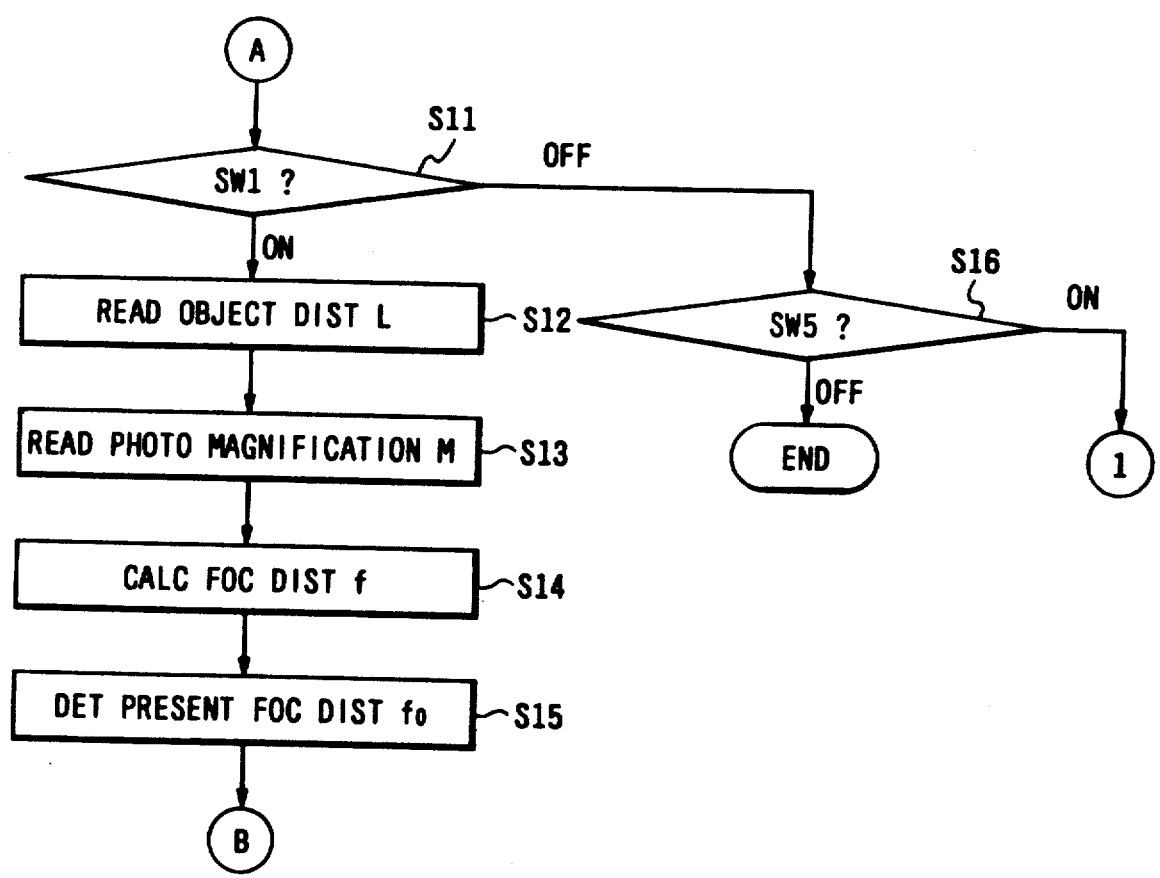
Figure 5:
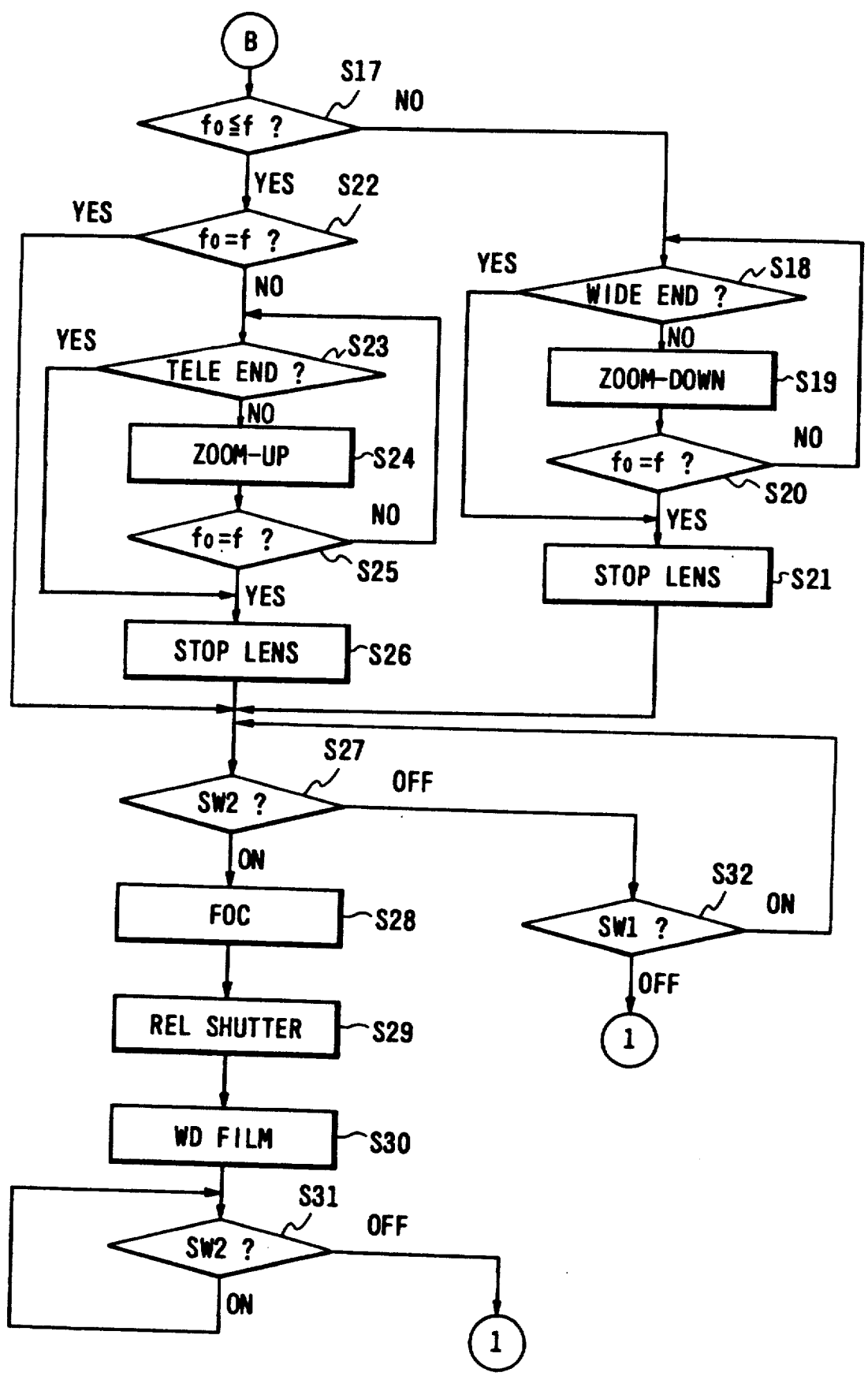

FIGS. 3-5 show the procedure of the static predetermined magnification photographing. When the above-described switch SW5 is closed, this program is started, and at the step S1 of FIG. 3, whether the zoom up switch SW3 is ON is first judged. If the switch SW3 is ON, at step S2, whether the photo-taking lens is now at the telephoto end position is judged. If the step S2 is affirmed, at step S5, the photo-taking lens is stopped and advance is made to step S6, and if the step S2 is negated, at step S3, the zoom up process is carried out. That is, a zoom up signal is output to the motor driving circuit 6 and the photo-taking lens is driven by the motor 12 to change the focal distance thereof to the long side. Advance is then made to step S4, where whether the switch SW3 is ON is judged. If the switch SW3 is ON, return is made to the step S2, where the process of the steps S2 and S3 is repetitively carried out, and if the switch SW3 is OFF, advance is made to step S6 via step S5.

On the other hand, if at the step S1, it is judged that the switch SW3 is OFF, advance is made to the step S6, where whether the zoom down switch SW4 is ON is judged. If the switch SW4 is ON, at step S7, whether the photo-taking lens is now at the wide angle end position is judged. If the step S7 is affirmed, at step S10, the photo-taking lens is stopped, and advance is made to the step S11 of FIG. 4, and if the step S7 is negated, at step S8, the zoom down process is carried out. That is, a zoom down signal is output to the motor driving circuit 6 and the photo-taking lens is driven by the motor 12 to change the focal distance thereof to the short side. Advance is then made to step S9, where whether the switch SW4 is ON is judged. If the switch SW4 is ON, return is made to the step S7, where the process of the steps S7 and S8 is repetitively carried out, and if the switch SW4 is OFF, advance is made to the step S11 of FIG. 4 via the step S10.

At the step S11, whether the half-depression switch SW1 is ON is judged, and if the switch SW1 is OFF, at step S16, whether the switch SW5 is ON is judged. If the switch SW5 is ON, return is made to the step S1, and if the switch SW5 is OFF, the process is terminated.

If at the step S11, it is judged that the switch SW1 is ON, at step S12, the object distance L which is the result of the detection by the distance measuring circuit 3 is read and also at step S13, the photographing magnification M is read, and advance is made to step S14. This photographing magnification is a value set by the magnification setting circuit 21 with the operation of the operating member. At the step S14, such a focal distance f that the photographing magnification M is obtained is a calculated on the basis of the read object distance L and photographing magnification M. Then, at step S15, the present focal distance $f_0$ is read from the focal distance detecting circuit 2, and at the step S17 of FIG. 5, whether $f_0 \leq f$ is judged.

If the step S17 is negated, that is, if $f_0 > f$, advance is made to step S18, where whether the photo-taking lens is now at the wide angle end is judged. If the step S18 is affirmed, advance is made to step S21, where the photo-taking lens is stopped, and advance is made to step S27. If the step S18 is negated, at step S19, the zoom down process is carried out, and at step S20, whether $f_0 = f$, that is, whether the photo-taking lens has been driven to the focal distance f, is judged. If the step S20 is negated, return is made to the step S18, and if the step S20 is affirmed, advance is made to step S27 via the step S21.

On the other hand, if the step S17 is affirmed, advance is made to step S22, where whether $f_0 = f$ is judged. If the step S22 is affirmed, advance is made to step S27, and if the step S22 is negated, that is, if $f_0 < f$, advance is made to step S23. At the step S23, whether the photo-taking lens is at the telephoto end is judged, and if the step S23 is affirmed, at step S26, the photo-taking lens is stopped, and advance is made to the step S27. If the step S23 is negated, at step S24, the zoom up process is carried out, and then at step S25, whether $f_0=f$ is judged. If the step S25 is negated, return is made to the step S23, and if the step S25 is affirmed, advance is made to the step S27 via the step S26.

At the step S27, whether the full depression switch SW2 is ON is judged, and if the switch SW2 is OFF, at step S32, whether the half-depression switch SW1 is ON is judged. If the switch SW1 is ON, return is made to the step S27, and if the switch SW1 is OFF, return is made to the step S1 of FIG. 3.

If at the step S27, it is judged that the switch SW2 is ON, at step S28, focusing is effected. That is, a focusing signal based on the object distance L read at the step S12 is output and the motor 11 is driven through the motor driving circuit 6, whereby the photo-taking lens is focused to a predetermined object. Then at step S29, shutter release is effected. That is, the object luminance from the photometric circuit 4 is read and the exposure value is calculated from this object luminance, etc., and the exposure control device such as the diaphragm and the shutter is driven on the basis of this exposure value to thereby effect exposure. Thereafter, at step S30, the film is wound up by one frame by the motor 13, and advance is made to step S31.

At the step S31, whether the full depression switch SW2 is ON is judged, and if the switch SW2 is ON, the program waits until the switch SW2 is opened, and when the switch SW2 is opened, return is made to the step S1.

According to the above-described procedure, the focal distance f (such a focal distance that the photographing magnification M is obtained) is calculated from the object distance L and the photographing magnification M, and the photo-taking lens is driven to this focal distance f and photographing is effected.

The procedure of the dynamic predetermined magnification photographing will now be described with reference to FIGS. 6–8.

Figure 6:
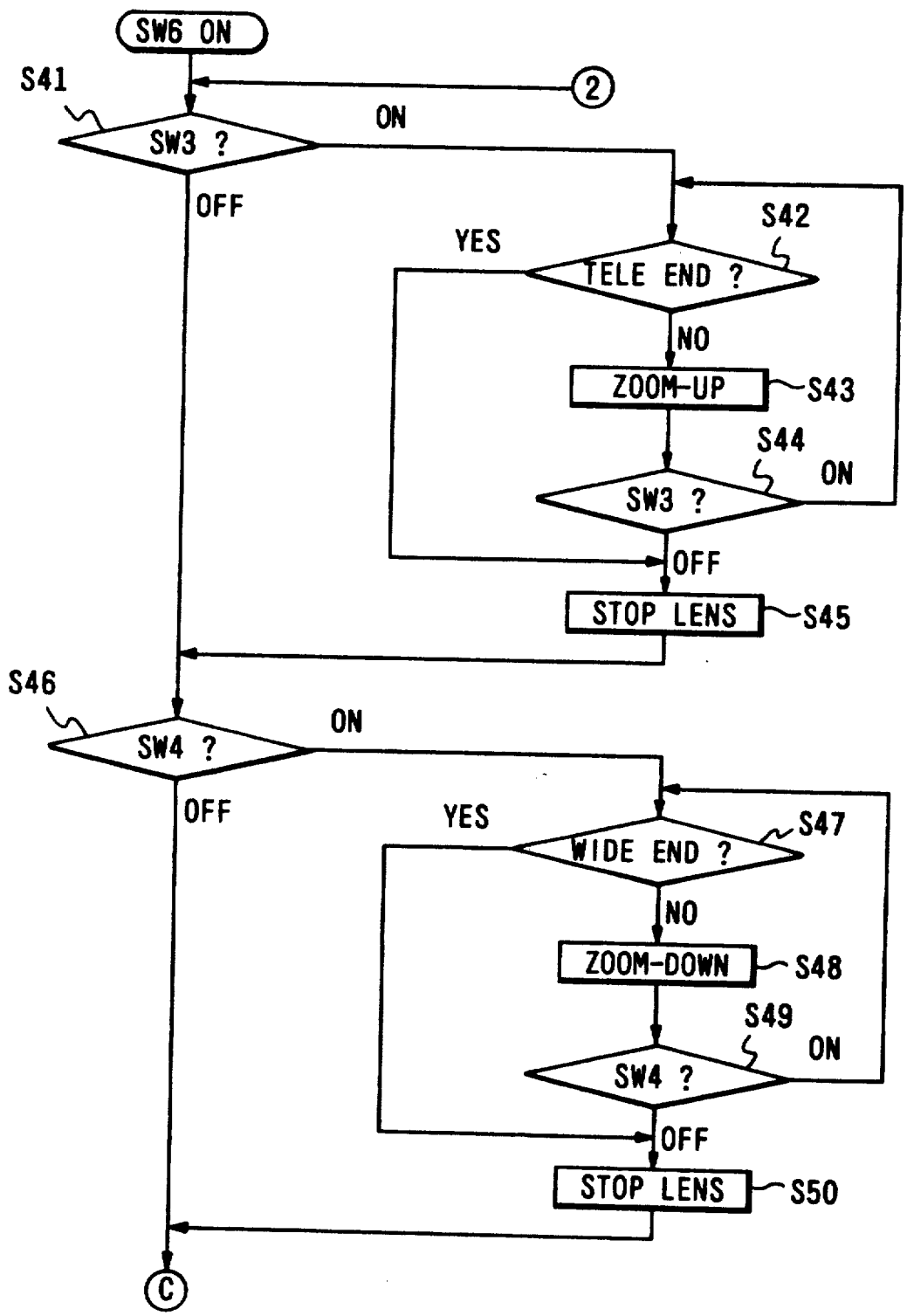
Figure 7B:
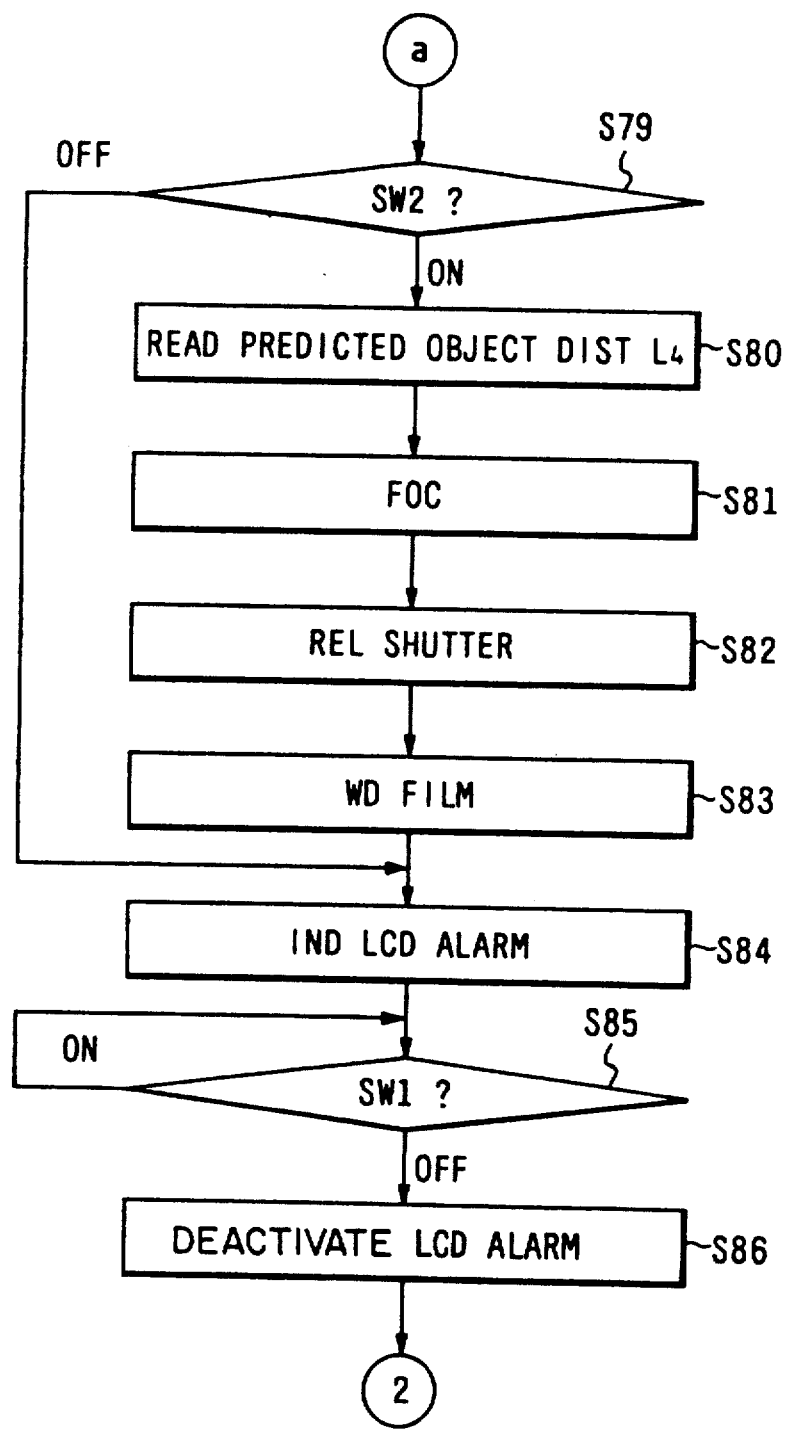
Figure 8:
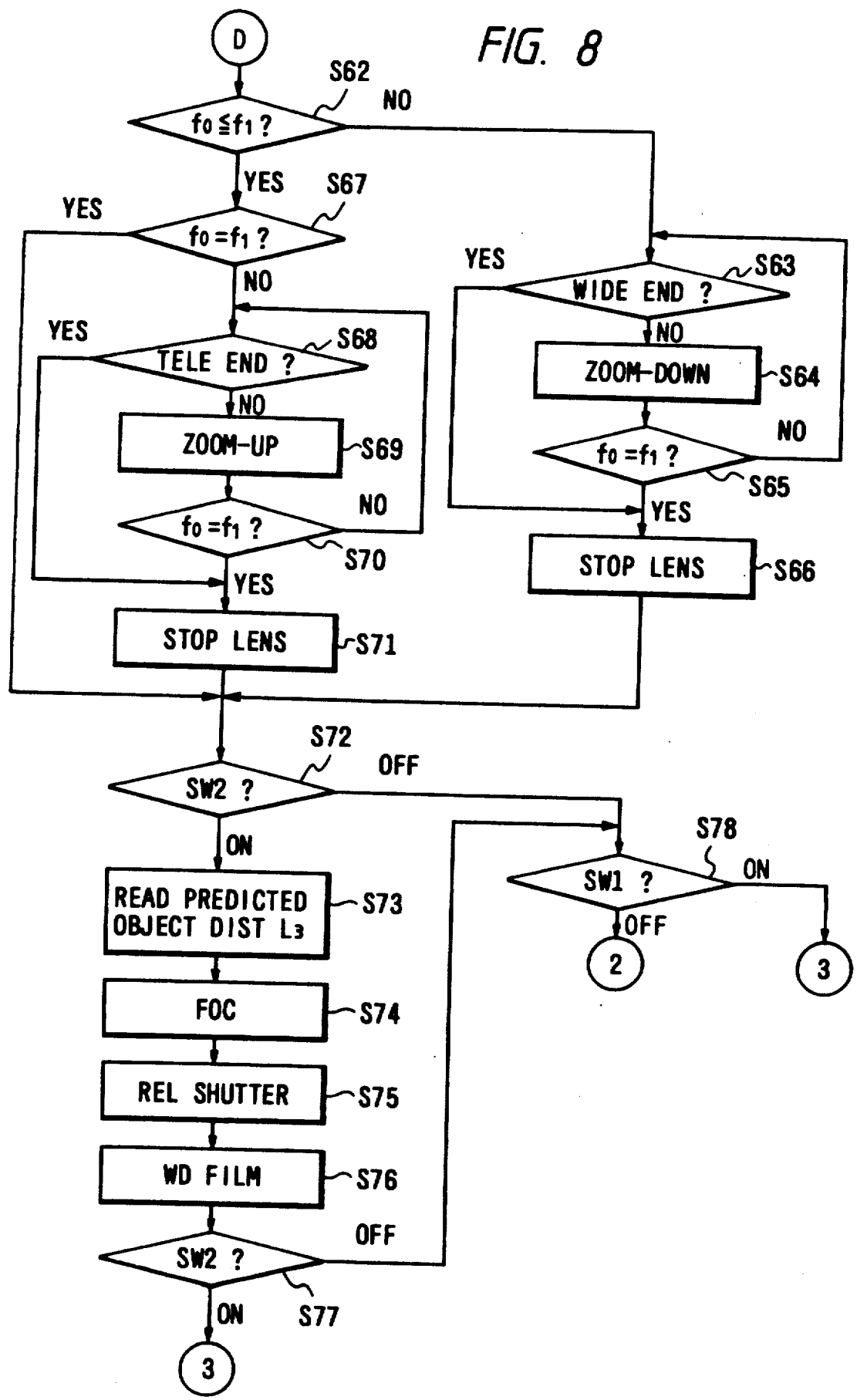

When the switch SW6 is closed, this program is started, and first, at the steps S41–S50 of FIG. 6, processes similar to the above-described steps S1–S10 are carried out, whereafter advance is made to the step S51 of FIG. 7. At the step S51, whether the switch SW1 is ON is judged, and if the switch SW1 is OFF, at step S87, whether the switch SW6 is ON is judged. If the switch SW6 is ON, return is made to the step S41, and if the switch SW6 is OFF, the process is terminated.

If at the step S51, it is judged that the switch SW1 is ON, at step S1, a flag F is rendered into "1", and then at step S52, the present focal distance $f_0$ is read from the focal distance detecting circuit 2 and also at step S53, it is memorized in the memory area. Then at steps S54 and S55, the object distance $L_1$ is read from the distance measuring circuit 3 and memorized, and in a predetermined time after it is counted by an internal timer, at steps S56 and S57, the object distance $L_2$ is again read and memorized, and advance is made to step S92. At the step S92, whether the flag F is "1" is judged, and if the flag F is "1", advance is made to step S58, and if the flag F is not "1", advance is made to step S59. At the step S58, the photographing magnification M is calculated on the basis of the present focal distance $f_0$ memorized at the step S53 and the object distance $L_1$ memorized at the step S55. This photographing magnification M corresponds to the object size obtained by the zooming process at steps S41–S50, and on the basis of this photo-graphing magnification M, predetermined magnification photographing is effected during the half-depression continuing operation or during the full depression continuing operation. Subsequently, advance is made to step S93, where the flag F is rendered into zero, and advance is made to step S59.

At the step S59, the predicted object distances $L_3$ and $L_4$ are calculated and memorized. That is, the speed of movement of the object in the direction of the optic axis is first calculated from the difference between the object distances $L_1$ and $L_2$ memorized at the steps S55 and S57 and said predetermined time. Then, the predicted object distance $L_3$ during shutter release is calculated from the predicted time from the present point of time via zooming and focusing until shutter release is effected and the calculated object speed. Here, the time required for zooming is one half of the time required for the photo-taking lens to be moved from the telephoto end to the wide angle end. Also, $L_4$ is the predicted object distance when the zooming time is not considered, and this is used when the object speed is too high for predetermined magnification photographing to be effected.

After the step S59, advance is made to step S60, where the predicted focal distance $f_1$ is calculated from the photographing magnification M calculated at the step S58 and the predicted object distance $L_3$. This predicted focal distance $f_1$ is a value for photographing the object at the photographing magnification M during shutter release which will be described later. Advance is then made to step S61, where whether the predicted focal distance $f_1$ is longer than the focal distance at the telephoto end or shorter than the focal distance at the wide angle end is judged. If the step S61 is negated, advance is made to the step S62 of FIG. 8.

At the step S62, whether $f_0 \leq f_1$ is judged, and if this step is negated, that is, if $f_0 > f_1$, advance is made to step S63, and at steps S63–S66, as at the above-described steps S18–S21 (FIG. 5), the photo-taking lens is driven to the predicted focal distance $f_1$ or to the wide angle end position, and advance is made to step S72. Also, if the step S62 is affirmed, advance is made to step S67, where whether $f_0 = f_1$ is judged. If the step S67 is affirmed, advance is made to step S72, and if the step S67 is negated, advance is made to step S68. At steps S68–S71, as at the steps S23–S26 of FIG. 5, the photo-taking lens is driven to the predicted focal distance $f_1$ or to the telephoto end position, and advance is made to step S72.

At the step S72, whether the full depression switch SW2 is ON is judged, and if the switch SW2 is OFF, at step S78, whether the half-depression switch SW1 is ON is judged. If the switch SW1 is ON, return is made to the step S54 (FIG. 7), where the above-described process is repeated. If the switch SW1 is OFF, return is made to the step S41 (FIG. 6).

If at the step S72, it is judged that the switch SW2 is ON, at step S73, the predicted object distance $L_3$ calculated and memorized at the step S59 is read out, and on the basis of this predicted object distance $L_3$, focusing is effected at step S74. That is, a focusing signal based on the predicted object distance $L_3$ is output and the photo-taking lens is driven to a predetermined focusing position by the motor 11 through the motor driving circuit 6. Then at step S75, shutter release is effected as described above, whereafter at step S76, the film is wound up by one frame by the motor 13, and advance is made to step S77. At the step S77, whether the full depression switch SW2 is ON is judged, and if the switch SW2 is ON, return is made to the step S54, where the above-described process is repeated and sequence shot at the photographing magnification M is effected, and if the switch SW2 is OFF, advance is made to step S78.

Also, if the step S61 of FIG. 7 is affirmed, that is, if the calculated predicted focal distance $f_1$ is greater than the focal distance at the telephoto end or smaller than the focal distance at the wide angle end, advance is made to step S79, where whether the full depression switch SW2 is ON is judged. If the switch SW2 is ON, at step S80, the predicted objected distance $L_4$ calculated at the step S59 is read out, and at step S81, focusing is effected on the basis of this predicted object distance $L_4$. Then at steps S82 and S83, shutter release and film winding-up are effected, and at step S84, the display to the effect that photographing could not be effected at a predetermined photographing magnification is effected by the LCD 9 through the indicating circuit 7, and advance is made to step S85. At the step S85, the program waits until the switch SW1 is opened, and when this switch is opened, the display is released at step S86, and return is made to the step S41. If at the step S79, it is judged that the switch SW2 is OFF, photographing is not effected and advance is made to step S84.

According to the above-described procedure of the dynamic predetermined magnification photographing, with the half-depression operation of the release button, the predetermined photographing magnification M is calculated and also the speed of the object along the optic axis of the lens is calculated, and on the basis of this object speed and the time required for zooming, the predicted object distance $L_3$ during shutter release is calculated. Then, on the basis of this predicted object distance $L_3$ and the photographing magnification M, the predicted focal distance $f_1$ (the focal distance to be assumed by the photo-taking lens during shutter release) is calculated. As long as the half-depression operation is continued, these processes are always carried out repetitively, and shutter release is effected with the full depression operation of the release button. However, it is only immediately after the half-depression that the photographing magnification M is set.

According to this, even in the case of an object moving in the direction of the optic axis of the photo-taking lens, zooming is always effected so that a desired object size is obtained as long as the half-depression operation is continued and therefore, it becomes unnecessary to perform the half-depression operation repetitively as in the prior art. Also, since the focal distance of the photo-taking lens is calculated on the basis of the predicted object distance during shutter release, a desired object size is obtained reliably.

Further, when the predicted object distance $L_4$ which does not take the zooming time into account is also calculated and the predicted focal distance $f_1$ for which the speed of movement of the object has been quickly calculated is outside the range of zooming, zooming is not effected, but photographing is effected at the focusing position based on this object distance $L_4$. In such case, the desired object size is not obtained, but there is obtained a photograph which is in focus.

In the construction of the above-described embodiment, the motor driving circuit 6 and the zooming motor 12 together constitute driving means 101, the distance measuring circuit 3 constitutes detecting means 102, and the CPU 1 constitutes calculating means 103 and control means 105.

Figure 9A:
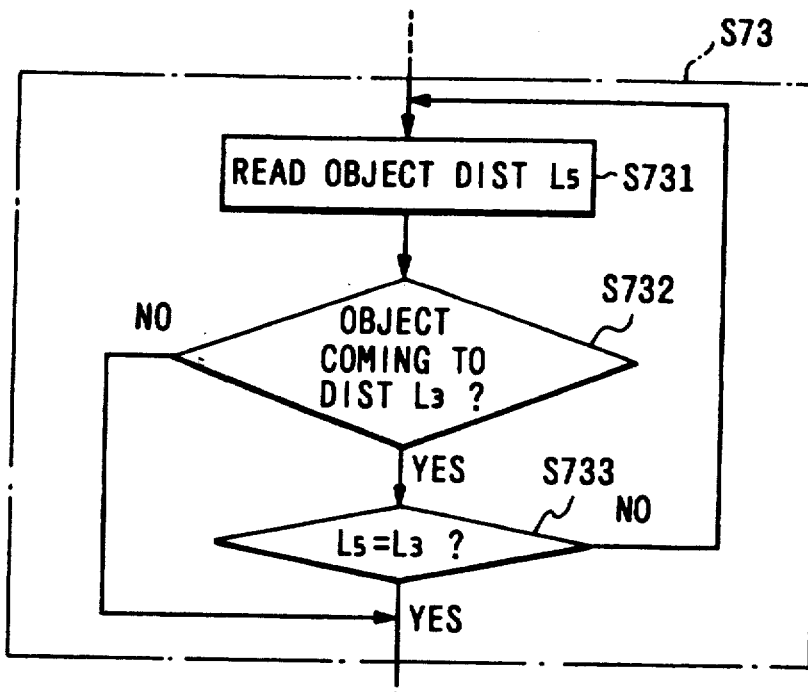
FIGS. 9A and 9B are flow charts showing a modification of the processing.
Figure 9B:
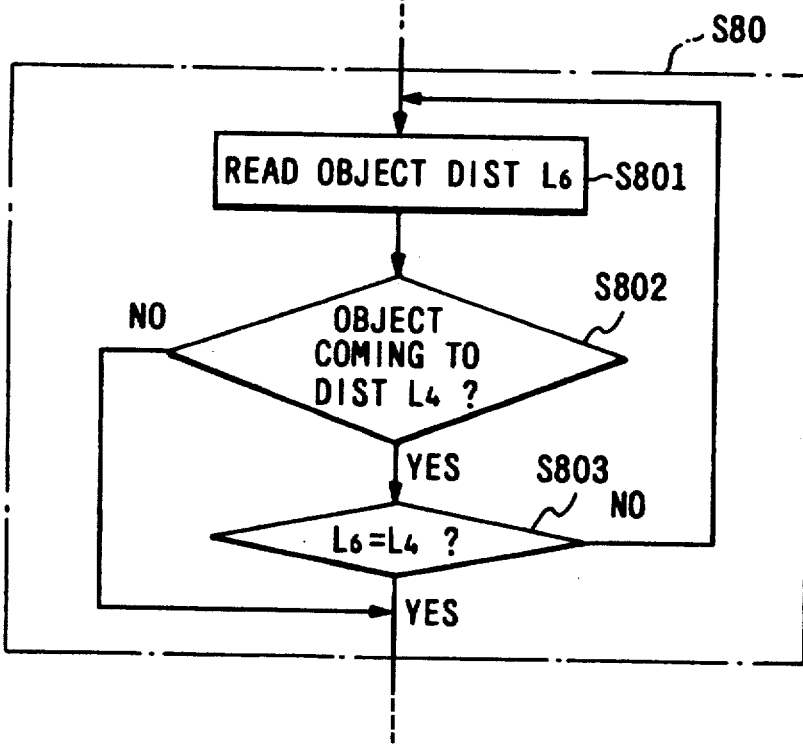

The above-described steps S73 and S80 may be changed as shown in FIGS. 9A and 9B, respectively. That is, if at the step S72 of FIG. 8, it is judged that the switch SW2 is ON, advance is made to the step S731 of FIG. 9A, where the object distance $L_5$ at the present point of time is read from the distance measuring circuit 3, and at step S732, whether the object is close to a position which is at the above-mentioned predicted object distance $L_3$ is judged on the basis of the object distance $L_5$ and the direction of movement of the object. This can be judged by whether $L_5 < L_3$ if the object is moving away from the camera, and can be judged by whether $L_5 > L_3$ if the object is moving toward the camera. If the step S732 is affirmed, at step S733, whether $L_5 = L_3$ is judged, and if this step S733 is negated, the process of the step S731 is repetitively carried out until the step S733 is affirmed. If at the step S733, it is judged that $L_5 = L_3$, advance is made to step S74. According to this, photographing is effected when $L_5 = L_3$, and therefore there can be reliably obtained a photograph which is in focus.

Likewise, the step S80 of FIG. 7 can be changed to the steps S801-S803 of FIG. 9B. According to this system, even when the speed of movement of the object is too high for predetermined magnification photographing to be effected, there can be obtained a photograph which is in focus.

Second Embodiment

Figure 10:
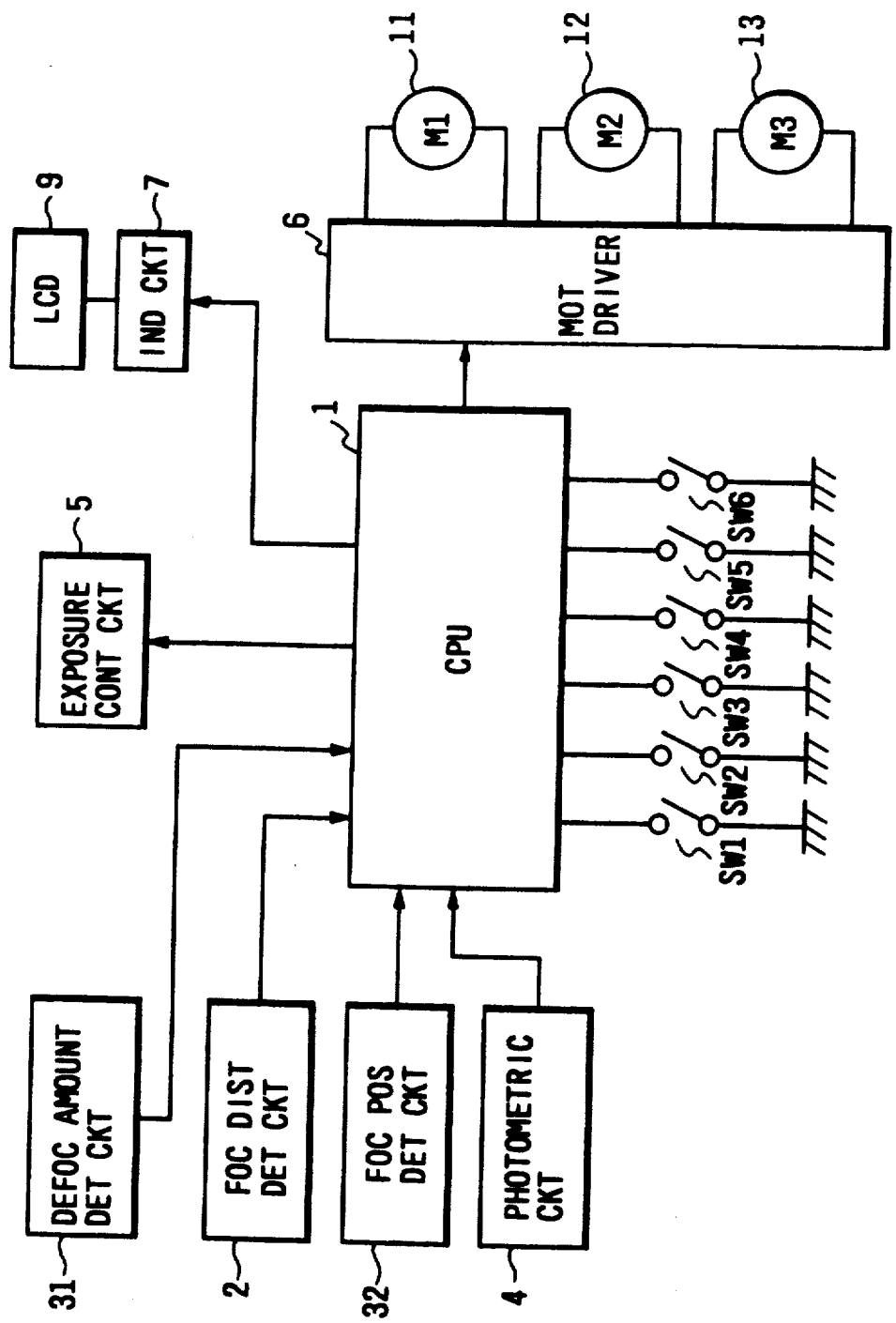
FIGS. 10 to 12 show a second embodiment of the present invention, FIG. 10 being a block diagram showing the general construction, and FIGS. 11 and 12 being flow charts showing the processing procedure.
Figures 11, 11A:
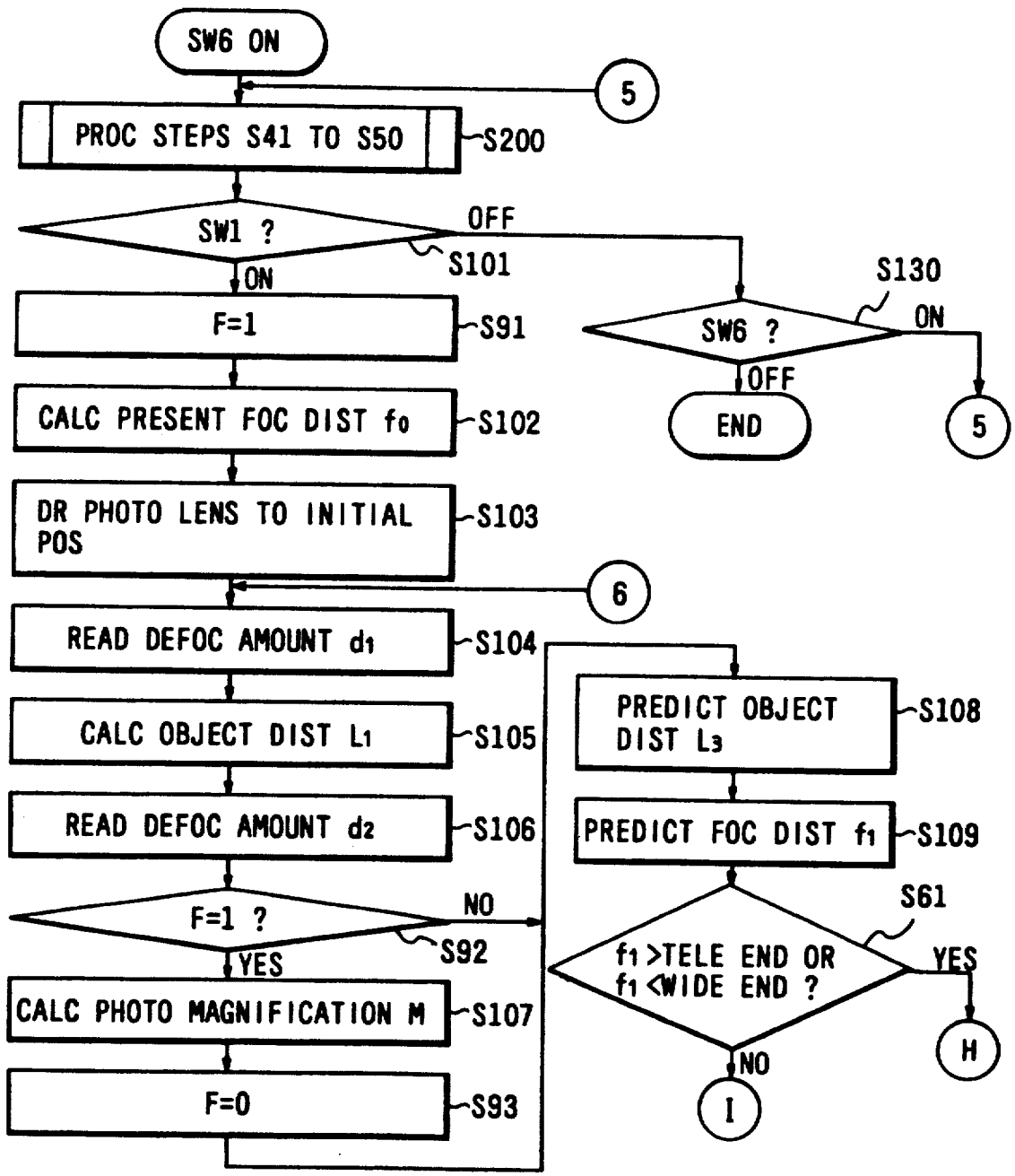
Figure 11B:
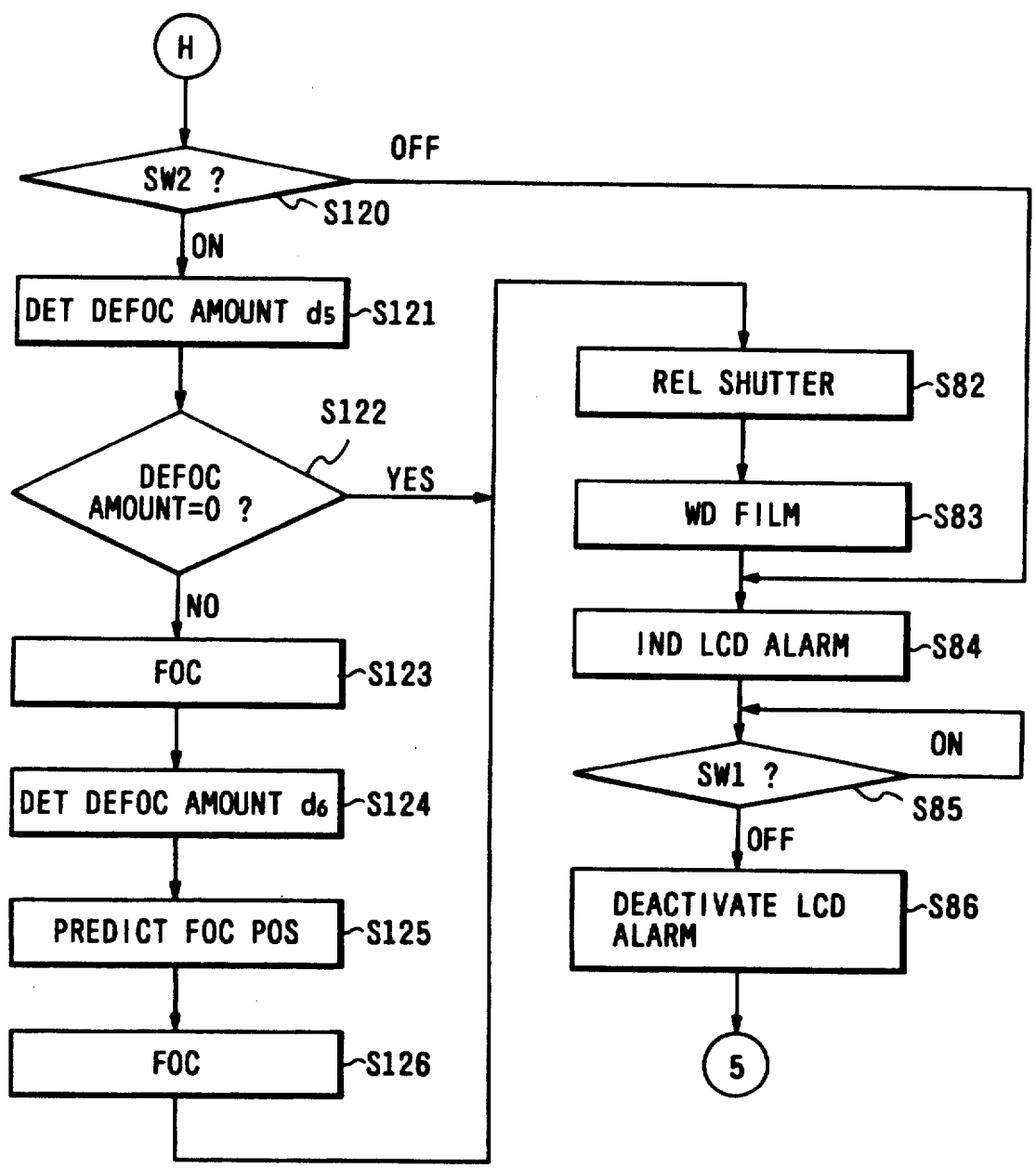
Figure 12:
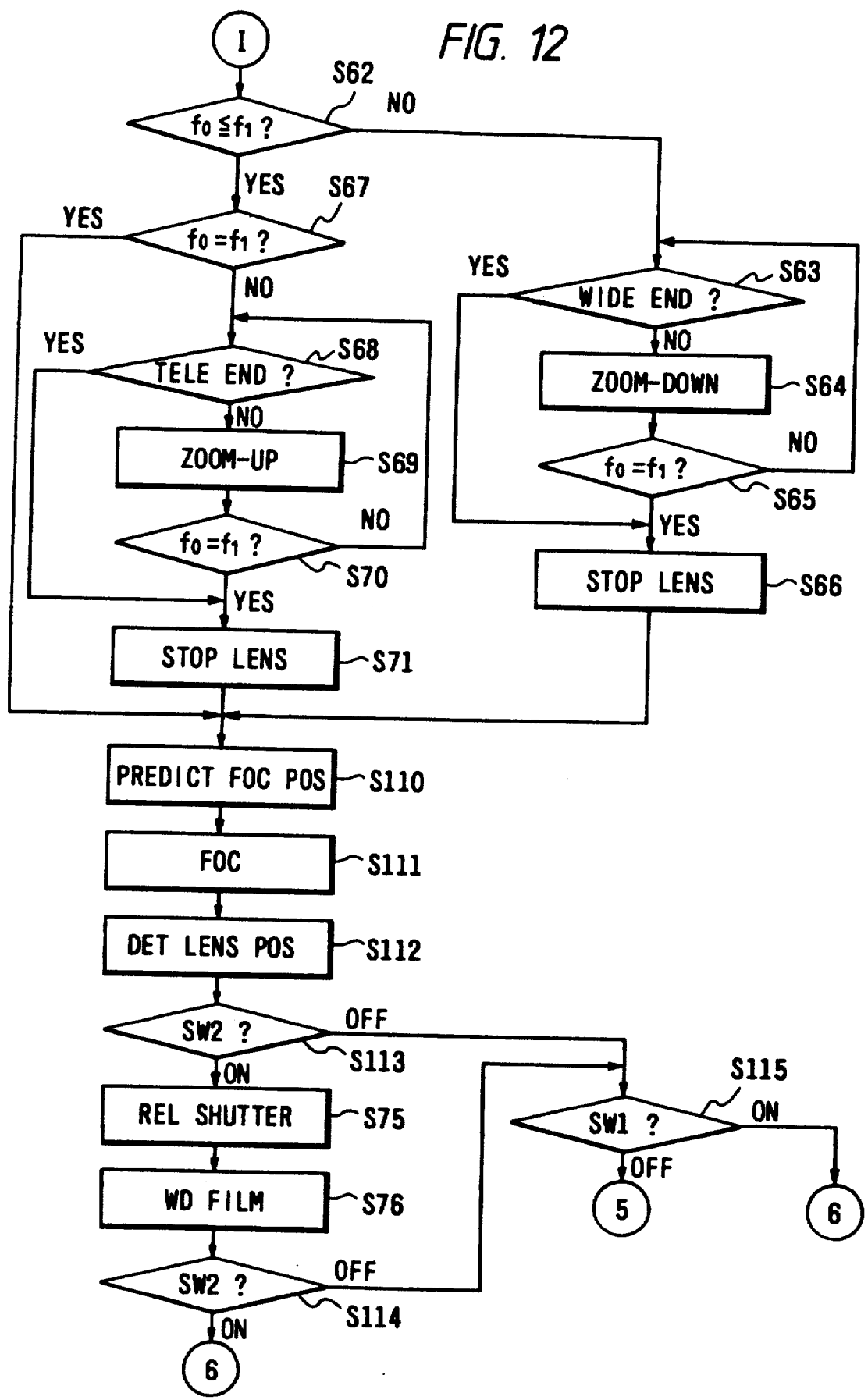

A second embodiment of the present invention will now be described with reference to FIGS. 10 to 12. In FIGS. 10 to 12, portions and steps similar to those in FIGS. 2 to 8 are given similar reference characters and need not be described.

In FIG. 10, a defocus amount detecting circuit 31 and a focusing position detecting circuit 32, instead of the distance measuring circuit 3, are connected to the CPU 1. The defocus amount detecting circuit 31 has a pair of light receiving elements each comprising, for example, a CCD line sensor, forms a pair of object images on the pair of light receiving elements through the photo-taking lens, and detects the amount an direction of deviation between the imaging plane of the object and the predetermined imaging plane on the basis of electrical signals from the respective light receiving elements. From the amount and direction of this deviation, it calculates a defocus amount for focusing the photo-taking lens on the object and inputs it to the CPU 1. The focusing position detecting circuit 32 detects the focusing position of the photo-taking lens and inputs it to the CPU 1. That is, the camera of the present embodiment effects focus adjustment not by distance measurement, but by the so-called TTL phase difference detection system.

The procedure of the dynamic predetermined magnification photographing in the present embodiment will now be described with reference to the flow charts of FIGS. 11 and 12.

As described above, when the switch SW6 is closed, this program is started, and at step S200, a process similar to the steps S41-S50 described with reference to FIG. 6 is carried out and advance is made to the step S101 of FIG. 11. At the step S101, whether the half-depression switch SW1 is ON or OFF is judged, and if the switch SW1 is OFF, at step S130, whether the switch SW6 is ON or OFF is judged. If the switch SW6 is ON, return is made to the step S200, and if the switch SW6 is OFF, the process is terminated.

If at the step S101, it is judged that the switch SW1 is ON, at step S91, the flag F is set to "1", and then advance is made to step S102, where the present focal distance $f_0$ is read. Then, at step S103, the photo-taking lens is driven to a predetermined initial position by the motor 11, and advance is made to step S104. At the step S104, the defocus amount $d_1$ calculated by the defocus amount detecting circuit 31 is read, and at step S105, the object distance $L_1$ is calculated from this defocus amount, and then, in a predetermined time, at step S106, the defocus amount $d_2$ is read again. Here, the defocus amounts $d_1$ and $d_2$ are the defocus amounts from the above-mentioned initial position, or from the focusing position detected at step S112 which will be described later.

Thereafter, at step S92, whether F=1 is judged, and if this step is affirmed, advance is made to step S107, and if the step S92 is negated, advance is made to step S108. At the step S107, the photographing magnification M is calculated from the object distance $L_1$ and the present focal distance $f_0$ of the photo-taking lens, and then at step S93, zero is set in the flag F. At the step S108, the predicted object distance $L_3$ during shutter release is calculated. That is, the speed of the object is first calculated on the basis of the difference between the defocus amounts $d_1$ and $d_2$ and the aforementioned predetermined time, and the predicted defocus amount for focusing the photo-taking lens on the object during shutter release is calculated on the basis of said object speed and the aforementioned predicted time from the present point of time via zooming and focusing until shutter release is effected. From this predicted defocus amount, the predicted object distance $L_3$ is calculated and memorized. Then, at step S109, the predicted focal distance $f_1$ is calculated from the predicted object distance $L_3$ an the photographing magnification M.

Thereafter, if the step S61 is negated, the zooming process of the steps S62–S72 of FIG. 12 (already described with reference to FIG. 8) is carried out and the photo-taking lens is driven to the predicted focal distance $f_1$, the wide angle end or the telephoto end, and then, at step S110, the predicted focusing position of the photo-taking lens is calculated from the above-mentioned object speed, and at step S111, the photo-taking lens is driven to the predicted focusing position by the motor 11 through the motor driving circuit 6. Whether the photo-taking lens has arrived at this predicted focusing position is judged on the basis of the output of the focusing position detecting circuit 32. By feed forward control, instead of such feedback control, the photo-taking lens may be driven to the focusing position.

Then, at step S112, the present focusing position of the photo-taking lens is memorized, and advance is made to step S113, where whether the full depression switch SW2 is ON or OFF is judged. If the switch SW2 is OFF, at step S115, whether the half-depression switch SW1 is ON or OFF is judged, and if the switch SW1 is ON, return is made to the step S104, and if the switch SW1 is OFF, return is made to the step S200. If at step S113, it is judged that the switch SW2 is ON, shutter release and film winding-up are effected at steps S75 and S76 as described above and advance is made to step S114. At the step S114, whether the switch SW2 is ON is judged, and if the switch SW2 is ON, return is made to the step S104, and if the switch SW2 is OFF, advance is made to step S115.

Also, if step S61 (FIG. 11) is affirmed, advance is made to step S120, where whether the full depression switch SW2 is ON is judged. If the step S120 is affirmed, advance is made to step S121, where the defocus amount $d_5$ for the object position at the present point of time is read from the defocus amount detecting circuit 31, and then at step S122, whether the defocus amount $d_5$ is zero is judged. If the step S122 is affirmed, the process of the above-described steps S82–S86 is carried out, and if the step S122 is negated, at step S123, focusing is effected on the basis of the defocus amount $d_5$, and advance is made to step S124.

At the step S124, the defocus amount $d_6$ is read again, and then at step S125, the predicted focusing position of the photo-taking lens is calculated. That is, as described above, the speed of movement of the object is found from the difference between the defocus amounts $d_5$ and $d_6$ and the difference between the reading times thereof, and the predicted defocus amount is calculated on the basis of said speed and the time until shutter release, and the predicted focusing position is calculated on the basis of said predicted defocus amount. In this case, as described above, the object speed is too high for predetermined magnification photographing to be effected and zooming is not effected and therefore, the time required for zooming is not included in the time until shutter release. Subsequently, advance is made to step S125, where the photo-taking lens is driven to this focusing position by the motor 11, and advance is made to step S82.

If the step S120 is negated, focusing and photographing are not effected and advance is made to step S84.

According to the above-described procedure, as in the first embodiment, the operability when predetermined magnification photographing is effected for a moving object is improved and also, photographing can be effected at a desired object size.

In the above-described first and second embodiments, the object position during shutter release is foreseen for a moving object and on the basis thereof, the focal distance of the photo-taking lens is found, but the foreseeing of this kind is not requisite in the present invention. That is, the operation of simply zooming-driving the photo-taking lens to such a focal distance that a desired photographing magnification can be obtained may only be performed as long as the release button is half-depressed.

According to the present invention, the design is such that as long as the release operation member is continuedly preliminarily operated, the zoom lens is always driven so as to assume such a focal distance that the object is photographed at a set photographing magnification and therefore, the operability is improved when predetermined magnification photographing is effected for an object moving along the optic axis of the photo-taking lens.

The procedure of the dynamic predetermined magnification photographing in another embodiment will now be described with reference to the flow charts of FIGS. 13 and 14. In the flow charts of FIGS. 13 and 14, portions identical to those in the flow charts of FIGS. 11 and 12 are given identical reference characters, and the present embodiment will be described chiefly about different portions.

Figures 13, 13A:
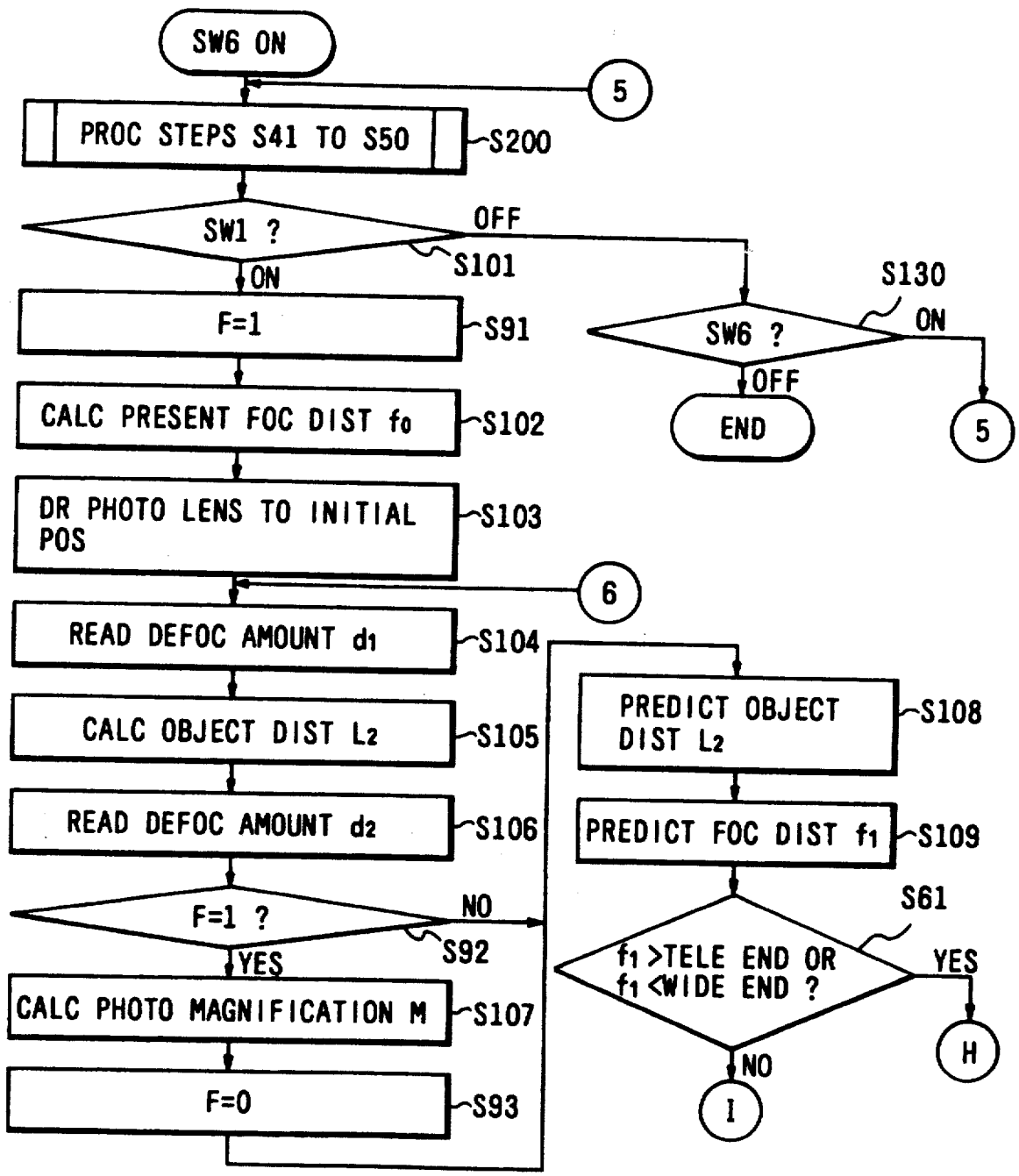
FIGS. 13, consisting of FIGS. 13A and 13B, and 14 show a third embodiment of the present invention.
Figure 13B:
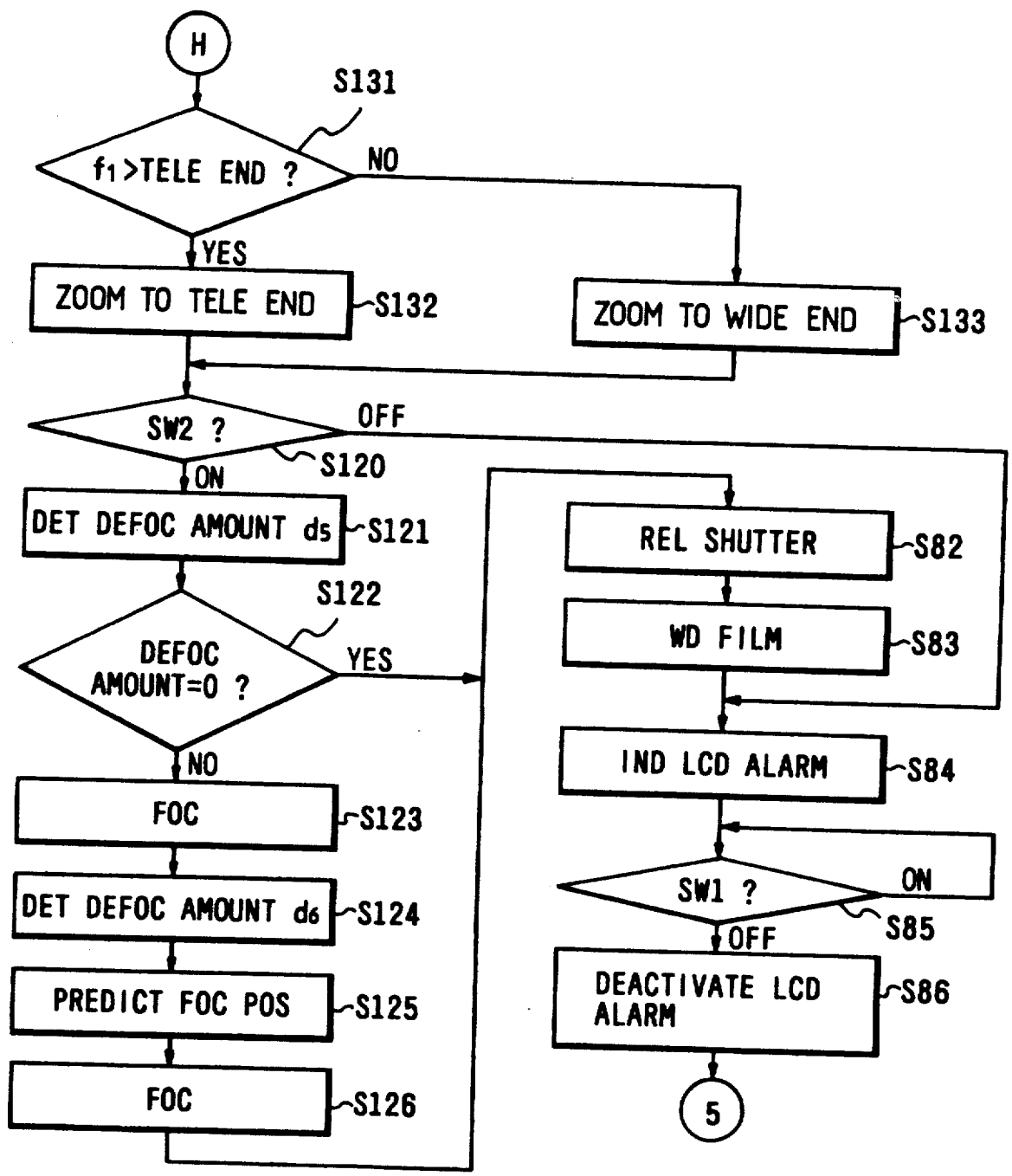

In FIG. 13, if step S61 is affirmed, advance is made to step S131, where whether the predicted focal distance $f_1$ is longer than the telephoto end is judged. If the step S61 is affirmed, advance is made to step S132, where the zooming operation to the telephoto end is performed. If step S62 is negated, advance is made to step S133, where the zooming operation to the wide angle end is performed. By this operation, the photo-taking lens is forcibly moved to one of the telephoto end and the wide angle end which is nearer if the predicted focal distance $f_1$ is outside the zooming range. After the operation at step S132 or step S133 is completed, advance is made to step S120.

Figure 14:
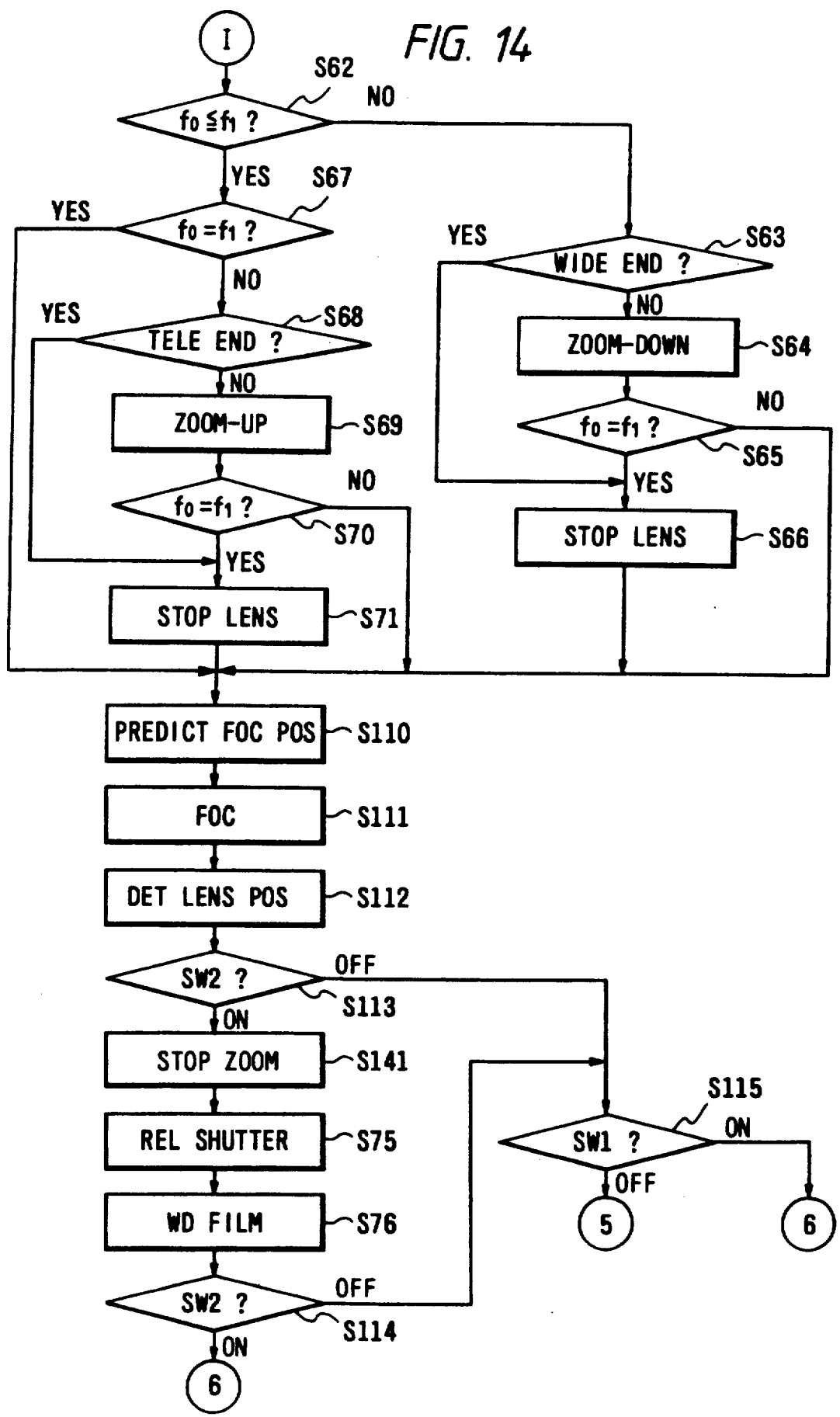

In FIG. 14, at step S70, whether $f_0 = f_1$ is judged. If the step S70 is affirmed, advance is made to step S71, where the photo-taking lens is stopped. However, if the step S70 is negated, the photo-taking lens is not stopped and advance is made to step S110, where the predicted focusing position is calculated. Thereafter, at step S111, the focusing operation is performed, and at step S112, detection of the lens position is effected, and at step S113, whether the switch SW2 is ON or OFF is judged. If the switch SW2 is judged to be ON, at the subsequent step S141, the zooming operation is stopped, and at the next step S75, the shutter release operation is performed. If the switch SW2 is judged to be OFF, advance is made to step S115, and if at this step, the switch SW1 is judged to be ON, return is made to ⑥, and the calculation of the object distance $L_1$, etc. is again started.

Also, in FIG. 14, if at step S65, $f_0 = f_1$ is negated, advance is made to step S110, where an operation similar to what has been described above is performed.

For example, according to the flow chart of FIG. 12, when the operation of steps S68 to S70 is being repetitively performed, the release operation at that point of time is inhibited even if the release button is depressed, but if what has been described above is done, the release operation will be performed without fail at the point of time whereat the release button, i.e., the switch SW2, has been depressed, and there will be no inconvenience in photographing. Also, even when the object moves, the object distance, etc. are newly calculated unless the switch SW2 is closed and thus, always appropriate photographing is effected.

What is claimed is:

1. A predetermined magnification photographing apparatus for a camera using a zoom lens for effecting zoom photographing at a predetermined photographing magnification comprising:
    driving means for driving said zoom lens;
    detecting means for detecting distance to an object moving along an optic axis of said zoom lens and speed of movement of said object;
    output means for outputting an operation signal; and
    control means for causing said detecting means to repetitively detect the distance to said object and the speed of movement of said object as long as said operation signal is output, repetitively predicting the distance to said object after a predetermined time on the basis of said detected distance and said detected speed of movement, repetitively determining a desired zoom position of said zoom lens on the basis of said predicted distance, and operating said driving means to drive said zoom lens to said desired zoom position.

2. A predetermined magnification photographing apparatus for a camera using a zoom lens for effecting zoom photographing at a predetermined photographing magnification comprising:
    driving means for driving said zoom lens;
    detecting means for detecting and outputting distance to an object;
    output means for outputting an operation signal; and
    control means responsive to said operation signal for causing, when an object moving along an optic axis of said zoom lens is to be photographed, said detecting means to be repetitively operated to thereby repetitively output the distance to said object after a predetermined time, repetitively determining a desired zoom position of said zoom lens on the basis of said predicted distance, and operating said driving means to drive said zoom lens to said desired zoom position.

3. A predetermined magnification photographing apparatus according to claim 2, wherein said predetermined time is determined on the basis of driving time and focusing time of said zoom lens.

4. A predetermined magnification photographing apparatus according to claim 2, wherein said control means is provided with a timer that counts a time when the latest distance is detected and a time when the distance before that is detected, and wherein said control means detects speed of movement of said object on the basis of said counted times, and predicts the distance to said object, when a release operation is performed, on the basis of said speed of movement.

5. A predetermined magnification photographing apparatus according to claim 4, when said control means, judges that the speed of movement of said object is higher than a predetermined value, said control means resets said desired zoom position to a predetermined position, and operates said driving means to drive said zoom lens t said predetermined position.

6. A predetermined magnification photographing apparatus according to claim 4, further comprising:
    an alarm device for producing an alarm in response to said desired zoom position being re-set to said predetermined position.

7. A predetermined magnification photographing apparatus according to claim 6, wherein said alarm device is an LCD display device.

8. A predetermined magnification photographing apparatus according to claim 2, wherein said control means receives an operable zoom range of said zoom lens as an input, and when said desired zoom position is determined, said control means compares said determined desired zoom position with said operable zoom range, said control means re-sets said desired zoom position to a predetermined position, and operates said driving means to drive said zoom lens to said predetermined position.

9. A predetermined magnification photographing apparatus according to claim 8, further comprising:
    an alarm device for producing an alarm in response to said desired zoom position being re-set to said predetermined position.

10. A predetermined magnification photographing apparatus according to claim 9, wherein said alarm device is an LCD display device.

11. A predetermined magnification photographing apparatus according to claim 2, further comprising:
    magnification setting means for inputting a photographing magnification;
    said control means determining said desired zoom position on the basis of the input photographing magnification.

12. A predetermined magnification photographing apparatus according to claim 11, wherein when an object not moving along the optic axis is to be photographed, said control means operates said detecting means only once in response to the operation signal from said output means to thereby cause said detecting means to output the distance to the last-mentioned object, and determines a desired zoom position of said zoom lens on the basis of the last-mentioned object, and determines a desired zoom position of said zoom lens on the basis of the last-mentioned distance and the photographing magnification input by said magnification setting means, and operates said driving means to drive said zoom lens to the last-mentioned desired zoom position.

13. A predetermined magnification photographing apparatus according to claim 2, wherein said output means outputs a release signal for effecting a release operation of said camera.

14. A predetermined magnification photographing apparatus according to claim 13, wherein said output means comprises a release button of said camera, and said operation signal is output upon half-depression of said release button, and said release signal is output upon full depression of said release button.

15. A predetermined magnification photographing apparatus according to claim 13, further comprising:
focusing means for effecting a focusing operation of said zoom lens, said focusing means being responsive to the release signal of said output means to start the focusing operation, the release operation being effected after the focusing operation is completed, said zoom lens being set by said focusing operation to a focus state determined on the basis of said predicted distance.

16. A predetermined magnification photographing apparatus for a camera using a zoom lens for effecting zoom photographing at a predetermined photographic magnification comprising:
driving means for driving said zoom lens;
detecting means for detecting a defocus amount of an object moving along an optic axis of said zoom lens to thereby detect distance to said object and speed of movement of said object;
output means for outputting an operation signal; and
control means for causing said detecting means to repetitively detect the distance to said object and the speed of movement of said object as long as said operation signal is output, repetitively predicting a focusing position of said object after a predetermined time on the basis of said detected distance and said detected speed of movement, repetitively determining a desired zoom position of said zoom lens on the basis of said predicted focusing position, and operating said driving means to drive said zoom lens to said desired zoom position.

17. A predetermined magnification photographing apparatus according to claim 16, wherein said predetermined time is determined on the basis of driving time of said zoom lens and time until a shutter release.

* * * * *